J. LENNON.
Harrow.
No. 198,920.  Patented Jan. 1, 1878.
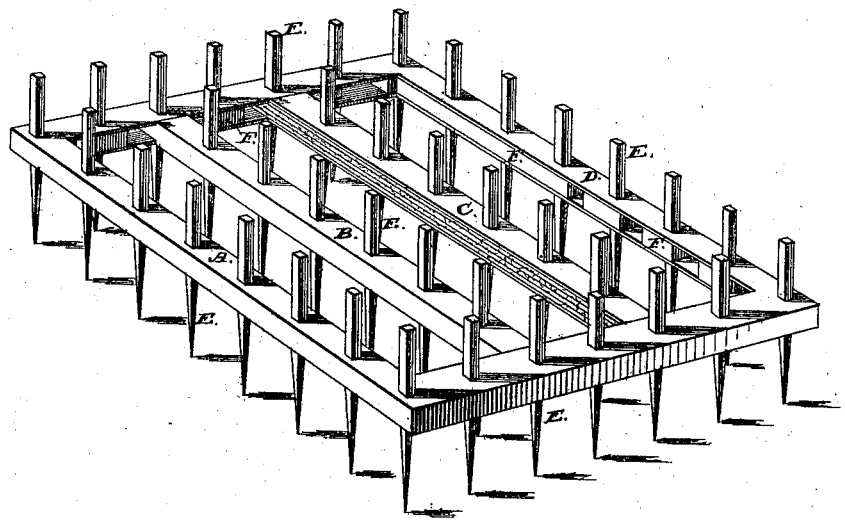

UNITED STATES PATENT OFFICE.

JOHN LENNON, OF SAN FRANCISCO, CALIFORNIA.

IMPROVEMENT IN HARROWS.

Specification forming part of Letters Patent No. 198,920, dated January 1, 1878; application filed August 24, 1877.

*To all whom it may concern:*

Be it known that I, JOHN LENNON, of the city and county of San Francisco, and State of California, have invented an improvement in securing harrow-teeth in tubular or hollow metallic beams; and I do hereby declare the following to be a full, clear, and exact description thereof, reference being had to the accompanying drawings.

The object of my invention is to provide a simple device for securing harrow-teeth in horizontal tubular or hollow metallic frames or beams.

While a metallic harrow-frame is preferable to a wooden one on account of its durability, and also on account of the great strength and lightness which may be combined when hollow or tubular metallic beams are used, it has heretofore been found difficult—not to say impossible—to secure the harrow-teeth in such beams, so that they will not be loosened and knocked out by the rough usage to which a harrow is subjected, because of the limited bearing that a metal tooth has in a tubular beam.

My invention is intended to remove this difficulty, by providing a means by which the teeth can be as firmly secured in such beams as they can be in wooden beams; and it consists in a harrow having horizontal tubular or hollow metallic beams, elastic inside filling F, and teeth inserted through beams and filling, all as hereinafter more fully described.

In the accompanying drawing, let A B C D represent the horizontal bars of a tubular or other hollow metallic harrow-frame. In the present instance I have represented the beams as being made of U-shaped angle-iron; but the invention applies to all kinds of hollow or tubular beams.

In order to secure the teeth E E in these beams I fill the groove or hollow space inside of the beam with wood, leather, or india-rubber, as represented at F. The teeth are then driven through the beam and filling in the ordinary way. The entire space need not be filled; but short blocks of any of the substances mentioned can be placed inside of the beam directly between the holes through which the teeth pass, so that the teeth will also pass through the blocks. This gives a bearing to the teeth through the entire thickness of the beam, and by using an elastic or yielding substance, like leather or india-rubber, the teeth will be griped with a tenacity that will prevent their being knocked out by any rough usage to which the harrow is subjected, and at the same time the weight of the harrow is not materially increased.

I am thus able to secure teeth in tubular or hollow metallic beams, so that they will be extremely difficult to remove.

Having thus described my invention, what I claim, and desire to secure by Letters Patent, is—

A harrow consisting of horizontal tubular or hollow metallic beams, elastic inside filling F, and teeth E, inserted through beams and filling, substantially as described.

In witness whereof I have hereunto set my hand and seal.

JOHN LENNON. [L. S.]

Witnesses:
    E. R. ANDERSON,
    FRANK A. BROOKS.